Figure 1:
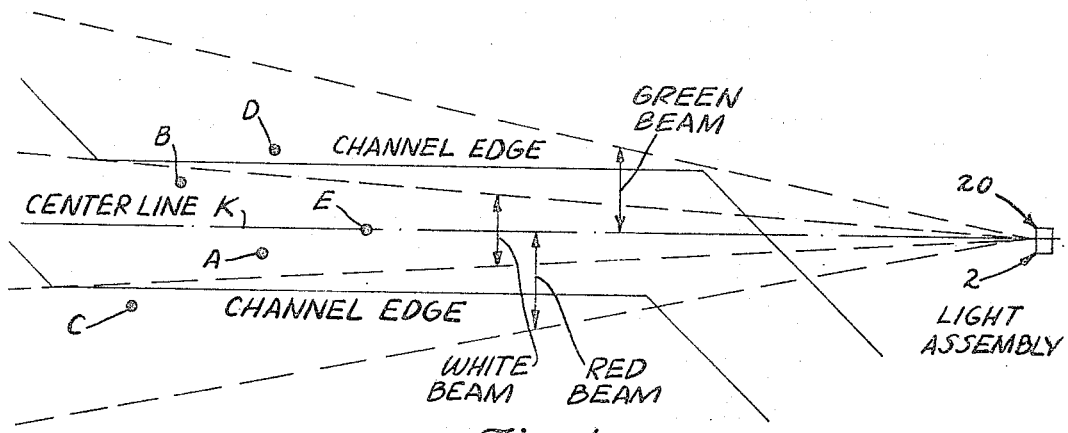

April 9, 1968

T. H. PROJECTOR 3,377,617

THREE-COLOR ALTERNATING-SIGNAL SINGLE
STATION RANGE LIGHT
Filed July 28, 1965

INVENTOR
THEODORE H. PROJECTOR

BY

ATTORNEY

United States Patent Office 3,377,617
Patented Apr. 9, 1968

3,377,617
THREE-COLOR ALTERNATING-SIGNAL SINGLE STATION RANGE LIGHT
Theodore H. Projector, 3304 Edgewood Road, Kensington, Md. 20795
Filed July 28, 1965, Ser. No. 475,457
3 Claims. (Cl. 340—29)

This invention relates to single station range lights for the general purpose disclosed in the previous applications of Projector and Rinkinen, S.N. 261,688, filed Feb. 28, 1963 now Patent No. 3,311,877, and S.N. 449,580, filed Apr. 20, 1965 now Patent No. 3,354,428, and has for its purpose the provision of a signal comprising a plurality of colors emanating from a single location for enabling a navigator to stay within the boundaries of a channel. The invention is also usable for other types of course demarcation, for example, for airplanes.

Briefly, the invention comprises a means and method wherein the limits of a safe area within a channel are demarcated by a beam from a light source of a particular color, preferably white. Overlapping such beam on one side of the course line (the center line of the channel) is a beam of a second color having its source substantially at the same location as the source of the first beam. The second light beam transversely extends beyond one edge of the first beam. Similarly, a third light beam of still another color originating at substantially the same place as the first two light beams, is disposed transversely beyond the other edge of the first beam. The third beam overlaps the first beam and has a meeting plane with the second beam along the course line, this being generally in the median plane of the first beam. Thus, the first beam may be of white light, the second beam of green light, and the third beam of red light. The particular feature of the invention resides in flashing the beams so that the white beam is visible while the green and red beams are simultaneously dark and vice versa. This alternate flashing may take place typically at one-second intervals, but any other convenient time period may be used. Accordingly, if the median plane of the white beam be disposed to coincide with the course line or center line of a channel, a navigator in the channel would be apprised of his position with respect to the course line. For example, if he is to one side of the course line but within a predetermined area demarcated by the angle of divergence of the white beam, he will see alternate flashing of the white beam and the red beam, or the green beam, depending upon which side of the course line he is on. This alternate flashing will, of course, be at one-second intervals for each color beam in sequence with each other. Should the navigator be beyond the transverse range of the white beam, he will see either the red or green beam flashing for one-second intervals alternating with one-second periods of darkness, depending, again, on which side of the course line he is on.

The mode of effecting alternate flashing of the white beam, and of the red and green beams simultaneously, can be in accord with any mode of turning lights off and on, for example, an alternating mechanical switch, a commutator, an electronic switch, or a rotating or sliding baffle plate in front of the beams, or a mechanical shutter arrangement, etc. The particular means for effecting such flashing can be selected for any particular installation and is a matter of choice and design well within the knowledge of persons skilled in the art.

From the above, it will be apparent that the primary object of the invention is to provide a very simple and economical mode of effecting course line navigation using fixed light sources at a single location.

Figure 2:
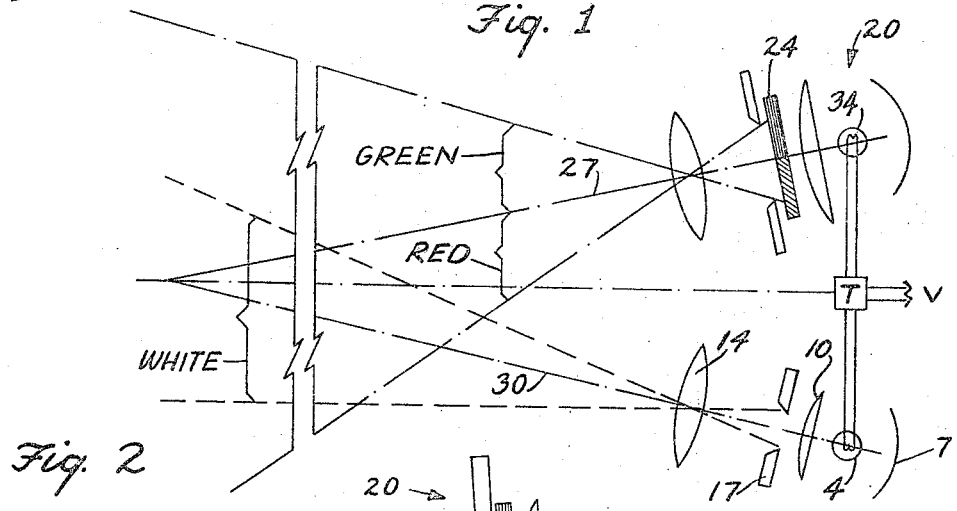
Figure 3:
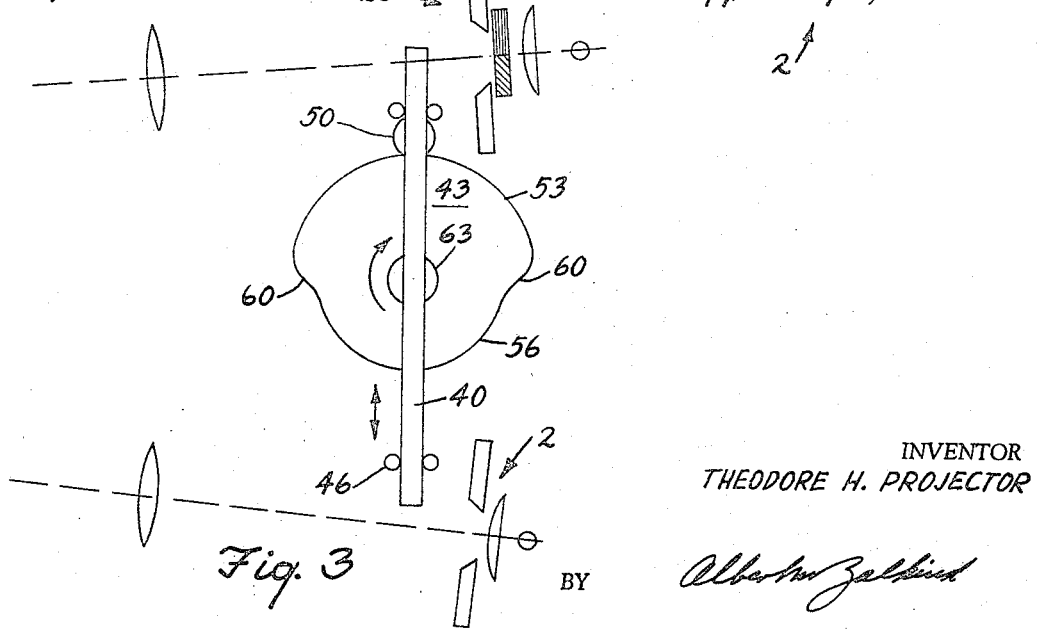

Other objects and features of the invention will be apparent from the more detailed description to follow in conjunction wtih the appended drawing, in which:

FIG. 1 is a view illustrating the position of the beams with respect to the boundaries and center line of a channel;

FIG. 2 is a diagrammatic view in plan showing an arrangement of lights for effecting the tri-color system. For clarity, the convergence angle between the two light sub-assemblies has been exaggerated. Actually, the dimensions of the lights and their separation are negligibly small compared to the distance to the navigator in the channel. Hence, the axes of the two light assemblies are, for practical purposes, parallel. Also, although the two sub-assemblies are separated physically, the navigator sees them as coincident since their angular separation is at or within the limit of resolution; and FIG. 3 is a vertical schematic view showing a sliding shutter arrangement for effecting alternate beam cut-off.

With reference to FIG. 1, a navigator at point A in the channel would see an alternating-color signal consisting of one second of white light followed by one second of red light, etc. This signal would inform him that he is in the acceptable limits of the channel and to the right of the center line. At B he would see a signal consisting of alternating white and green light and would know that he is within acceptable limits and to the left of the center line. At C, however, the signal would be flashing red only (red for one second, dark for one second). This would inform him that he is outside acceptable navigation limits and must immediately turn to the left until the dark interval between the red signals is filled by white signals, thus letting him know that he is in a safe zone in the channel. Similarly, at point D, the observed signal would be green, alternating with dark intervals, and the navigator must turn right to get into the correct navigation zone where the signal is white-green-white, etc.

If the navigator is at point E, on the channel center line, he is in the middle of the white beam but at the boundary between the red and green parts of the alternating signal. Thus he will see a white light alternating with a signal of a color which is determined by the precise character of the boundary. This color may be any additive combination of red and green. Ideally, the boundary should be as sharp as possible so that the transition from one color to the other (red to green or vice versa), as the navigator crosses the center line, is abrupt. Normally, the navigator will have approached the center line from one side or the other and will thus ascertain that he has reached the center line when the color of the signal that alternates with white, that is, the red or the green, becomes ambiguous. If by chance he has approached the channel precisely on the center line, slight deviation in course will quickly resolve any ambiguity about the signal.

Referring to FIG. 2, a light projector 2, generating a beam of white light is diagrammatically illustrated and is of entirely conventional nature having a lamp 4, reflector 7, condensing lens 10, and projecting lens 14. Intermediate the lenses is a mask 17 arrangement which sharply delimits the beam. Thus, it will be understood that a well-defined beam of white light will be projected into the channel. In a similarly conventional manner a composite two-color beam is projected by light sub-assembly 20 effected by a two-color filter 24 having green and red areas. The composite beam has a plane of juncture 27, the boundary between the red and green parts of the beam. The light sub-assemblies are entirely conventional and will be understood to be mounted adjacent each other, a matter of a few inches so that the boundary plane 27 is substantially coincidental with the central plane 30, of the white beam.

Thus, from the above, it will be understood that the light sources are fixed and have no mechanical movement of any kind and that they are situated closely adjacent to each other and on the projected center line of the channel.

Any conventional electrical control timing system, such as indicated by T and electrical source V, may be utilized connected to the lamps for alternately flashing them. Thus, lamp 4 will be energized for the white beam when lamp 34 for the composite red-green beam is dark and vice versa, the intervals of energization being conveniently one second although obviously any other suitable interval may be used.

The light projection methods shown in FIG. 2 are for purposes of illustration only. Any conventional technique for projecting well-defined beams with the required characteristics may be employed, and many such techniques are known in illuminating engineering.

Referring to FIG. 3, a beam alternating arrangment is shown wherein the white-light sub-assembly 2 and the red-green sub-assembly 20 are located one above the other rather than side by side as in FIG. 2. In this modification, the lamps are not switched on and off, but a mechanical arrangement comprising a shutter 40 which is reciprocated by a cam 43 is utilized. The illustration is purely diagrammatic, but it will be understood that suitably fixed guide rollers, such as 46, may be utilized for guidance of the shutter as it moves up and down, the shutter having a roller 50 which engages the dwells 53 and 56 of the cam 43 rotated by a motor 63. Thus, rotation of the cam moves the baffle upwardly while the weight of the baffle is relied on to move it downwardly, although, obviously, a spring arrangement could be used in conjunction therewith. The transition between the cam dwells 53 and 56 is fairly sharp, as shown by the shoulders 60. Thus, the cam dwell 53 would open the white beam for one second while the dwell 56 would open the red-green beam for one second. The transition shoulders 60, being much smaller in point of cyclic time than the cam dwells, would have only negligible effect on the alternating timing.

I claim:

1. A single-station range light comprising a white light source and a multi-color light source and means for effecting directing of the beams of said sources in the same general direction wherein the beam from said white light souce determines the desired limits of a course to be followed and wherein the beams from said multi-color light source demarcate respectively the left and right sides of the channel and adjacent areas, and means for darkening the beam of said white light source when the beams from said multi-color source are visible and vice versa.

2. A single-station range light system comprising means providing a fixed single light beam to demarcate a predetermined course, means providing a pair of fixed light beams of colors differing from each other and differing from said single beam color and disposed to demarcate areas on either side of a predetermined plane of said single light beam, said pair of light beams being arranged to have a common boundary plane within the width of said single light beam and said pair of beams extending beyond said width on respective sides thereof, and means for periodically darkening said first-mentioned light beam and said pair of light beams so that said single light beam is visible when said pair of light beams are dark and vice versa.

3. A method of apprising a navigator of the limits of a course to be followed which comprises emitting a light beam of a first color exactly covering said course limits, emitting a light beam of a second color to partially overlap said first light beam and extend beyond the width thereof at one side thereof, emitting a light beam of third color to partially overlap said first color light beam and extend beyond the other side thereof, and periodically darkening the light beam of said first color with simultaneous transmission of the light beams of said second and third colors and vice versa, whereby a nevigator within the limits of width of said first color light beam will see alternate light colors of said first beam and either of said other beams, and wherein said navigator will see one or the other of said second and third colors alternated with dark periods when he is disposed beyond the width of said first color light beam.

No references cited.

JOHN W. CALDWELL, *Primary Examiner.*

ALVIN H. WARING, *Examiner.*